Aug. 9, 1938.  E. D. COOK  2,125,891
SOUND RECORDING
Filed June 30, 1936
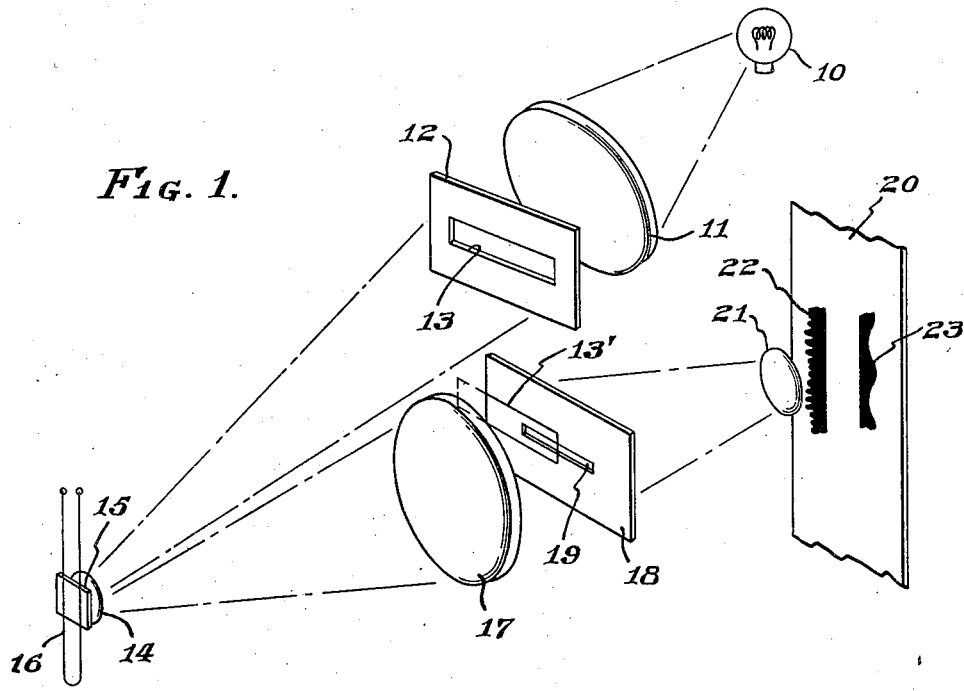
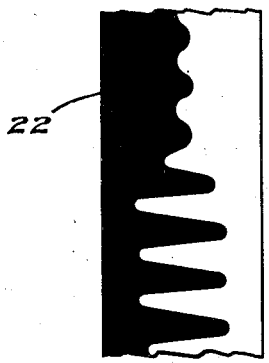
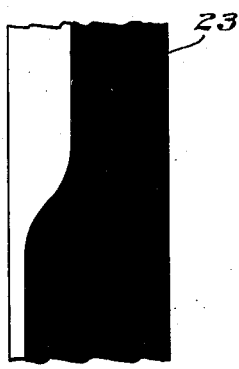
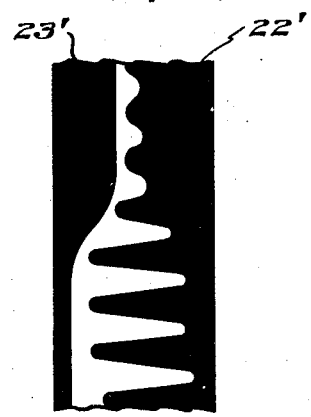
Inventor
*Ellsworth D. Cook*
By
Attorney Patented Aug. 9, 1938

2,125,891

UNITED STATES PATENT OFFICE 2,125,891

SOUND RECORDING

Ellsworth D. Cook, Scotia, N. Y., assignor to Radio Corporation of America, a corporation of Delaware Application June 30, 1936, Serial No. 88,131

7 Claims. (Cl. 179—100.3)

This invention relates to a new and improved method of and apparatus for the photographic recording of sound. More particularly it relates to a method and apparatus for producing a photographic sound record on film with ground noise reduction.

Some older types of photographic sound records have a large unused clear portion wherein at no modulation approximately half of the sound track was left clear. This resulted in undesired sounds when reproduced due to the unexposed but developed silver grains in the clear area of the film and also due to dust, dirt, scratches, etc., on the film. In order to avoid this noise, which is generally referred to as "ground noise", it was proposed in Robinson Patent 1,854,159 to shift the axis of the sound track so as to blacken all but the used portion of the positive sound track. In McDowell Patent 1,855,197 it was proposed to accomplish this blacking of the positive sound track by interposing a shutter between the recording galvanometer and the film to prevent exposure of the unused portion of the negative film and thereby cause a corresponding blackening of the positive film.

In the present invention the sound track produced is similar to that produced by McDowell but is produced by an entirely different method and apparatus.

One object of the invention is to produce an anti-ground noise sound track without the use of a rectifier or low pass filter circuit.

Another object of my invention is to provide a sound track which may be printed either with or without ground noise reduction.

Another object of my invention is to provide simplified records for producing anti-ground noise sound track.

Another object of my invention is to provide an optical means for producing a record corresponding to the envelope of the sound waves.

Further objects of my invention will be apparent to those skilled in the art from a reading of the following specification and an inspection of the accompanying drawing in which—

Figure 1 is a schematic illustration of a recorder according to my invention,

Figure 2 is an enlarged view of the sound record as recorded,

Figure 3 is an enlarged view of the masking record as recorded and,

Figure 4 is an enlarged view of a positive print corresponding to Figs. 2 and 3.

Referring first to Figure 1, 10 indicates the exciter lamp, the light from which is focused on the mirror 15 by the lens 11, passing through the aperture plate 12 which is provided with an aperture 13, the dimensions of which are determined as hereinafter described. Light passing through the aperture 13 passes through the lens 14 onto the mirror 15 of the galvanometer 16, whence it is reflected through the lens 14 and the lens 17 to the slit plate 18. The focal length of the lens 14 is so chosen that an image 13' of the aperture 13 is thrown on the slit plate 18 which is provided with a narrow slit 19. The light passing through or past the slit 19 or past the plate 18 is focused on the film 20 by a lens 21. The slit 19 is made of such a width that the image thereof on the film 20 is of the order of .001" or less in order that sound waves of sufficiently high frequency may be properly recorded as indicated at 22. A portion of the image 13' passes the left hand end of the plate 18 and is imaged by the lens 21 upon the film producing the record 23. The heighth of the aperture 13 is so chosen that the image thereof on the film 20 is one wave length of the lowest sound frequency to be recorded. It will be apparent that when the mirror 15 is oscillated by the galvanometer 16 the image 13' will move back and forth longitudinally of the slit plate 18 thereby producing the records 22 and 23. Due to the width of the aperture 13 the record 23 instead of corresponding to the individual sound waves will be smoothed out so as to correspond to the average amplitude of the sound waves. That this is true necessarily follows from the fact the rectangular spot 13' follows the individual waves but is too wide to resolve them into individual images in the absence of the slit 19. As shown in Fig. 2, the envelope of record 22 shifts with variation in amplitude while as shown in Fig. 3 the record 23 corresponds with the envelope of the record 22. When the negative record 22 is printed on a positive film it produces a print such as shown at 22' in Fig. 4. If after the negative 22 has been printed on the positive the positive is again printed from the masking record 23 a corresponding print 23' is obtained which blackens the unused clear portion of the positive sound track and thus producing an anti-ground noise record. It will be apparent to those skilled in the art that it is not necessary for me to run the positive film through the printer twice in order to produce the record of Fig. 4 but that I can superpose the images 22 and 23 in any other equivalent manner on the positive film.

Having now described my invention, I claim:

1. Sound recording apparatus including means for producing a beam of light corresponding in width with the wave length of the lowest frequency to be recorded, means for vibrating said beam in accordance with sound waves, means for directing a portion of said beam onto a record strip for recording the envelope of sound waves and means for selecting a narrow portion of said beam and directing it toward said record strip for recording the sound waves.

2. Sound recording apparatus including means for producing a beam of light corresponding in width with the wave length of the lowest frequency to be recorded, means for vibrating said beam in accordance with sound waves, means for selecting a narrow portion of said beam, and means for directing toward said record strip for recording the sound waves and the envelope thereof said narrow portion and a portion of said beam.

3. Sound recording apparatus including means for producing a beam of light of a width not less than the wave length of the lowest frequency to be recorded, means for vibrating said beam in accordance with sound waves, means for selecting a narrow portion of said beam, and means for directing toward said record strip for recording the sound waves and the envelope thereof said narrow portion and a portion of said beam.

4. Sound recording apparatus including means for producing a beam of light having a width of the order of the wave length of the lowest frequency to be recorded, means for vibrating said beam in accordance with sound waves, means for selecting a narrow portion of said beam, and means for directing toward said record strip for recording the sound waves and the envelope thereof said narrow portion and a portion of said beam.

5. The combination of means for producing a light beam, a mask provided with a light slit, means for vibrating said beam across said slit in accordance with impulses to be recorded with one of its ends extending beyond the edge of said mask, and means for exposing a record to the beam portions transmitted through said slit and past said edge.

6. The combination of means for producing a light beam, a mask provided with a light slit, means for vibrating said beam longitudinally across said slit in accordance with impulses to be recorded with one of its ends extending beyond the edge of said mask, and means for exposing a record to the beam portions transmitted through said slit and past said edge.

7. The impulse recording method which includes vibrating a light beam in accordance with said impulses, selecting a relatively narrow portion of said beam to produce a record of said impulses, and selecting a relatively wide portion of said beam to produce a record of the envelope of said impulses.

ELLSWORTH D. COOK.